United States Patent
Gil et al.

(10) Patent No.: US 8,456,698 B2
(45) Date of Patent: *Jun. 4, 2013

(54) ADAPTIVE ILLUMINATION INDEPENDENT MATCHING OF OUT OF GAMUT SPOT COLORS USING VARIOUS GAMUT MAPPING TECHNIQUES

(75) Inventors: Alvaro E. Gil, Rochester, NY (US); Yao Rong Wang, Webster, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 978 days.

This patent is subject to a terminal disclaimer.

(21) Appl. No.: 12/533,542

(22) Filed: Jul. 31, 2009

(65) Prior Publication Data
US 2011/0026053 A1   Feb. 3, 2011

(51) Int. Cl.
G06F 15/00 (2006.01)
H04N 1/40 (2006.01)
G06K 9/00 (2006.01)

(52) U.S. Cl.
USPC .............................. 358/1.9; 358/2.1; 382/167

(58) Field of Classification Search
None
See application file for complete search history.

(56) References Cited

U.S. PATENT DOCUMENTS

| | | | | |
|---|---|---|---|---|
| 5,929,906 A * | 7/1999 | Arai et al. | ................... | 348/223.1 |
| 6,157,469 A | 12/2000 | Mestha | ................... | 358/504 |
| 6,639,669 B2 | 10/2003 | Hubble, III | ................... | 356/319 |
| 6,744,531 B1 | 6/2004 | Mestha et al. | ................. | 358/1.9 |
| 7,835,032 B2 * | 11/2010 | Sekine | ........................ | 358/1.9 |
| 8,107,141 B2 | 1/2012 | Patrick et al. | | |
| 2005/0030560 A1 | 2/2005 | Maltz et al. | | |
| 2006/0170994 A1 | 8/2006 | MacKinnon et al. | | |
| 2007/0153243 A1 | 7/2007 | Mestha et al. | ................ | 353/122 |
| 2007/0291312 A1 * | 12/2007 | Kaneko et al. | ................ | 358/2.1 |
| 2008/0043263 A1 | 2/2008 | Hancock et al. | ............... | 358/1.9 |
| 2008/0043264 A1 | 2/2008 | Gil et al. | ........................ | 358/1.9 |
| 2008/0043271 A1 | 2/2008 | Gil et al. | ........................ | 358/1.9 |
| 2008/0218784 A1 | 9/2008 | Ben-Chorin et al. | .......... | 358/1.9 |
| 2010/0228511 A1 | 9/2010 | Chin et al. | | |

OTHER PUBLICATIONS

Braun et al., Development and Evaluation of Six Gamut-Mapping Algorithms for Pictorial Images, The Seventh Color Imaging Conference, 1999, Digital Imaging Technology Center, Xerox Corporation, Webster, NY.

Montag et al., Gamut Mapping: Evaluation of Chroma Clipping Techniques for Three Destination Gamuts, The Sixth Color Imaging Conference: Science, Systems and Applications, 1998, Rochester Institute of Technology, Rochester, NY.

Montag et al., Psychophysical Evaluation of Gamut Mapping Techniques Using Simple Rendered Images and Artificial Gamut Boundaries, IEEE Transactions on Image Processing, Jul. 1997, vol. 6, No. 7.

Explanation of Various Light Sources and Their Use in Visual Color Matching Applications, GTI TrueLight TrueColor, GTI Graphic Technology, Newburgh, NY.

(Continued)

*Primary Examiner* — Barbara Reinier
(74) *Attorney, Agent, or Firm* — Pillsbury Winthrop Shaw Pittman, LLP

(57) ABSTRACT

A methodology is disclosed to achieve adaptive illumination independent matching of out-of-gamut spot colors. In one embodiment, the methodology includes an iterative process to determine a variety device specific recipes for out-of-gamut spot colors across different illumination spectra and gamut mapping techniques, and then automatically choosing and/or recommending the optimal recipe and gamut mapping technique that provides the lowest color dispersion across a variety of illuminants under consideration.

25 Claims, 11 Drawing Sheets

OTHER PUBLICATIONS

Srinivas et al., Genetic Algorithms: A Survey, IEEE Computer Magazine, Jun. 1994, pp. 17-26.

Torczon, On the Convergence of the Multidirectional Search Algorithm, SIAM Journal Optimization, Feb. 1991.

Illumination Sensor, Mar. 2002, Climatronics Corporation, Bohemia, NY.

Metamerism Index, Applications Note, Insight on Color, 2008, vol. 9, No. 4.

Color Inconstancy, Applications Note, Insight on Color, 2008, vol. 12, No. 11.

Imai et al., Comparitive Study of Metrics for Spectral Match Quality, Munsell Color Science Laboratory, Rochester Institute of Technology, Rochester, NY.

Standard Illuminant, obtained on Jul. 31, 2009 from Wikipedia at http://en.wikipedia.org/wiki/Standard_illuminant.

Mestha et al., Fundamentals of Color Engineering, Appendix A of Control of Color Imaging Systems, May 2009, CRC Press, ISBN 978-0-8493-3746-8.

Lagarias et al., Convergence Properties of the Nelder Mead Simplex Algorithm in Low Dimensions, Technical Report 96-4-07, May 1, 1997, Bell Laboratories, Murray Hill, NJ.

\* cited by examiner

ADAPTIVE ILLUMINATION INDEPENDENT MATCHING OF OUT OF GAMUT SPOT COLORS USING VARIOUS GAMUT MAPPING TECHNIQUES

FIELD

This application generally relates to the management and reproduction of spot colors by a printing system, and in particular, adaptive illumination independent matching of out-of-gamut spot colors using various gamut mapping techniques.

BACKGROUND

Spot colors are recognized as standardized colors, for example, according to an industry, proprietary, and/or organizational system. Some of the known spot color classification systems include: Pantone®, Toyo, DIC, American Newspaper. Publishers Association (ANPA), and HKS. Accurate printing of spot colors is important to achieve a good color match to the original hardcopy proof on paper.

Standard spot color proofs are typically supplied by vendors, such as Pantone®, in the form of samples which can be separated for measurement and viewing. They may also be supplied in the form of swatch books, Spot colors are often used, or can be used, for large background areas, which may be the most color critical portion of a particular page.

Many software packages have the ability to enter or create device dependant recipes, such as Cyan, Magenta, Yellow and Black (CMYK), using multi-dimensional profiles for a particular spot color and store them for future use. These software packages may also allow users to manually edit the recipe.

A problem, however, with this approach is that the CYMK recipe that was originally entered and/or obtained through manual entry may not be very accurate at the time of reproducing the spot colors due to (a) variations in the print engine state, (b) operator error associated with manual adjustments or modifications to CMYK recipe values; and (c) inaccurate recipes to begin with.

An automated software application "Spot Color Control" (SCC) based on the Xerox Corp.'s "Automated Spot Color Editing (ASCE)" technology is currently available for use with inline sensors for the Xerox Corp.'s iGen3® and DC8000® Digital Production Presses. This technology uses an iterative process to find the device specific recipe under a D50 illuminant. While the printed spot colors may appear matched to the hardcopy proof under D50 light source, those colors may not "look" the same when viewed under other light sources.

The conventional techniques used for matching spot colors are optimized to a 2 degree observer and a D50 light source. Thus, even if the spot colors are matched under the D50 illuminant, they may look different when viewed under non-standard illuminant.

FIG. 1(a) shows color variations for a Pantone® 202C spot color under multiple illuminants. The spot color has a near perfect match under the D50 light source (i.e., delta-E values are approximately zero). However, the figure shows that the expected delta-E variations across other D series illuminants (D series with correlated color temperature from 3600 to 7500, or D36 to D75), Proprietary light source #1 fluorescence lamp, white LED, and Proprietary light source #2 fluorescence lamp. The maximum spread across the selected group of illuminants is about 4.25 delta-E 1976 ("deitaEab") and 2.41 delta-E 2000 ("deltaE2K").

FIG. 1(b) shows color variations for a Pantone® 251C spot color across multiple illuminants when the spot color is mapped for a D50 illuminant and a 2 degree observer.

FIG. 1(c) shows color variations for a Pantone® 3385C spot color across multiple illuminants when the spot color is mapped for a D50 illuminant and a 2 degree observer.

A seasoned color expert (human) may be able to recommend which light sources are best to use for a specific color matching application. However, due to variety of light sources available this may be difficult. Also, the light sources used for viewing may vary depending on environmental factors (e.g., humidity, temperature, ambient lighting conditions, location and geometry of the light source, etc.), which are difficult to control.

SUMMARY

According to one embodiment, a method for adaptive illumination independent matching of out-of-gamut spot colors for a printing system comprises: obtaining a color value for at least one spot color; obtaining a color value for each of a plurality of illuminants; converting the at least one spot color value to illuminant specific target values corresponding to each of the plurality of illuminants using each of a plurality of gamut mapping techniques; determining a device specific recipe for each of the target values for the printing system; calculating a color dispersion value for each of the plurality of illuminants using each of the plurality of gamut mapping techniques based on the device specific recipes by printing and measuring test patterns; and selecting a device specific recipe and one of the gamut mapping techniques for the at least one spot color that yields the lowest color dispersion across the plurality of illuminants.

According to another embodiment, a system for adaptive illumination independent matching of out-of-gamut spot colors for a printing system comprises: a print engine configured to render color; a sensor configured to measure a color value of a printed color; and a processor configured to: (i) obtain a color value for at least one spot color; (ii) obtain a color value for each of a plurality of illuminants; (iii) convert the at least one spot color value to illuminant specific target color values corresponding to each of the plurality of illuminants using each of a plurality of gamut mapping techniques; (iv) determine a device specific recipe for each of the target values for the printing system; (v) calculate a color dispersion value for each of the plurality of illuminants using each of the plurality of gamut mapping techniques based on the device specific recipes by printing and measuring the test patterns; and (vi) select a device specific recipe and one of the gamut mapping techniques for the at least one spot color that yields the lowest color dispersion across the plurality of illuminants.

According to yet another embodiment, a computer-readable storage medium comprises computer-readable instructions stored therein that when executed by a processor are configured to implement a method for adaptive illumination independent matching of out-of-gamut spot colors for a printing system.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

This application is related to U.S. application Ser. No. 12/504,332 filed Jul. 16, 2009, herein incorporated by reference in its entirety.

A methodology is disclosed to achieve adaptive illumination independent matching of out-of-gamut spot colors. In one embodiment, the methodology includes an iterative process to determine a variety of device specific recipes for spot colors across different illuminants and gamut mapping techniques, and then automatically choosing and/or recommending the optimal recipe and the gamut mapping technique that provides lowest color dispersion across a variety of spectra under consideration.

This approach may be used with a variety of gamut mapping techniques, for example, disclosed in U.S. patent application Ser. No. 12/391,473 filed Feb. 24, 2009; U.S. Patent Application Publication No. 2008/0043264; U.S. Patent Application Publication No. 2008/0043271; K. M. Braun, R. Balasubramanian, and R. Eschbach, "Development and evaluation of six gamut-mapping algorithms for pictorial images," The Seventh Color Imaging Conference, pp. 144-148 (1999); E. D. Montag and M. D. Fairchild "Gamut Mapping: Evaluation of Chroma Clipping Techniques for Three Destination Gamuts" The Sixth Color Imaging Conference, pp. 57-61 (1998); E. D. Montag and M. D. Fairchild "Psychophysical Evaluation of Gamut Mapping Techniques Using Simple Rendered Images and Artificial Gamut Boundaries" IEEE Transaction on Image Processing, Vol. 6, No. 7, pp. 977-989 (1997), herein incorporated by reference in their entireties.

The gamut mapping techniques may be used for both printing and non-printing devices. One non-printing device includes a display device having tunable individually-addressable Fabry-Perot membranes. See, e.g., U.S. Patent Application Publication No. 2007/0153243, herein incorporated by reference in its entirety. Any discussion of any specific printing or non-printing devices herein is not to be construed as limiting.

Figure 2:
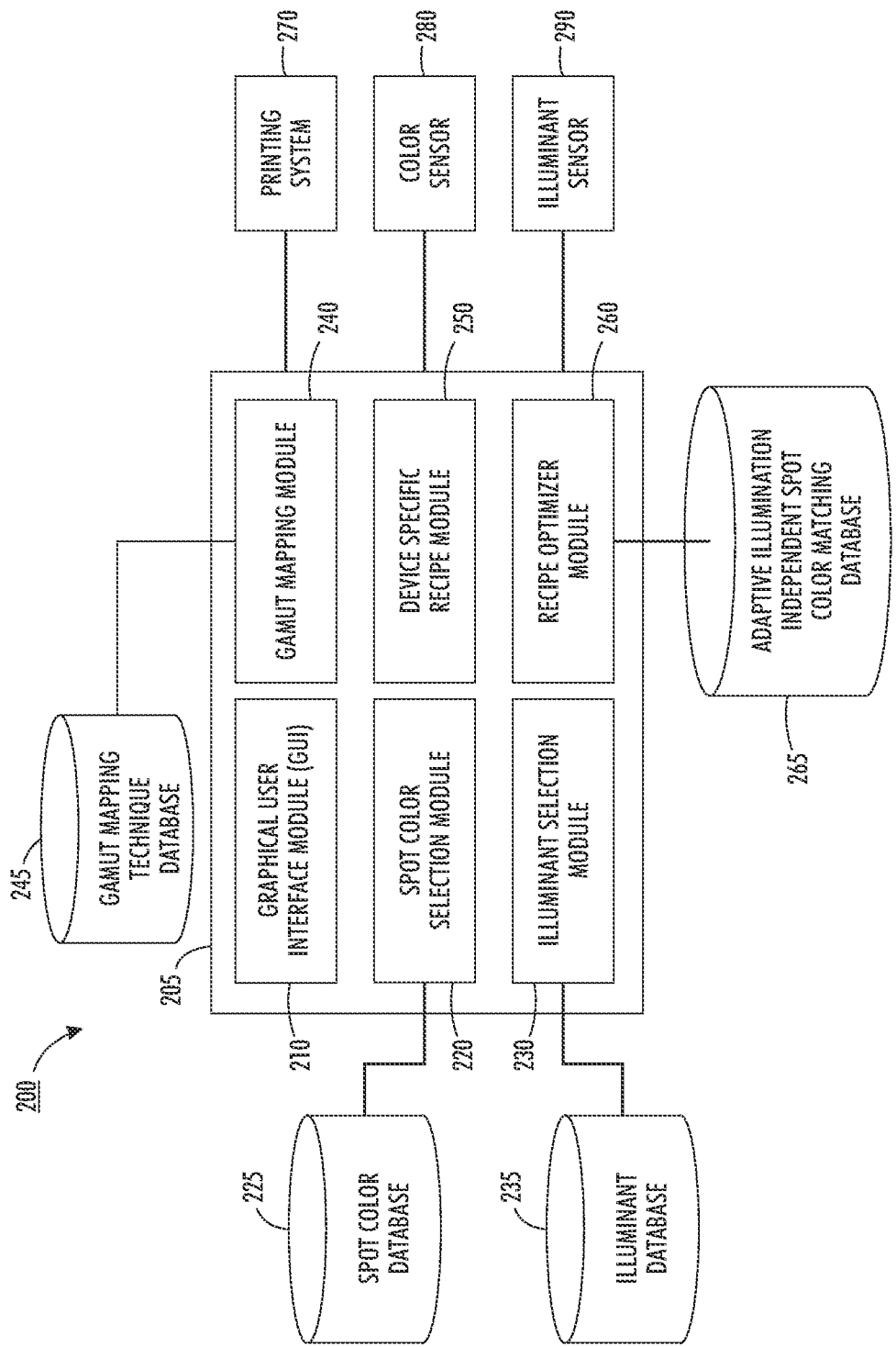
FIG. 2 shows an exemplary system for adaptive illumination independent matching of spot colors according to an embodiment.

FIG. 2 shows an exemplary system 200 for adaptive illumination independent matching of spot colors according to an embodiment.

The system 200 may include an application 205 having a plurality of modules, including but not limited to, a graphical user interface module 210, a spot color selection module 220, an illuminant selection module 230, a gamut mapping module 240, a device specific recipe module 250, and a recipe optimizer module 260. One or more of the modules comprising application 205 may be combined and/or include additional modules.

The application 205 may interface with one or more additional systems, such as a spot color database 225, an illuminant database 235, a gamut mapping technique database 245 and an adaptive illumination independent spot color matching database 265. Moreover, the application may interface with a printing system 270, a color sensor 280, and an illumination sensor 290. For some purposes, not all modules and elements may be necessary.

According to one embodiment, the application 205 may be software (firmware) created using any number of programming languages. Of course, it will be appreciated any number of hardware implementations, programming languages, and operating platforms may be used. As such, the description or recitation of any specific hardware implementation, programming language, and operating platform herein is exemplary only and should not be viewed as limiting.

The application 205 may be stored on a computer- or machine-readable storage media having computer or machine-executable instructions executable by a processor. In one implementation, the application 205 may reside on a memory of the print controller of a printing system or the printing system itself.

Alternatively, or additionally, the application 205 may be a stand-alone application running on a computer which interfaces with a printing system, for example, through a remote network connection, or via a computer readable storage media (i.e., flash memory, DVD/CD ROM, floppy disk, removable or permanent hard drive etc.). In some implementations, the application 205 may be a "plug-in" application that is incorporated into a third-party software application including, for example, document-processing or image production applications. Other configurations may be also implemented.

The graphical user interface module 210 is configured to generate a graphical user interface (GUI) on a display device and to control the various display and input/output (I/O) features of the application. The graphical user interface module 210 may generate display signals to the display device. In one implementation, it may provide one more "windows" or panes for displaying information to the user. The display device may include a cathode ray tube (CRT), liquid crystal display (LCD), plasma, or other display devices.

Moreover, the graphical user interface module 210 allows the user to interact with the application 205. For example, the graphical user interface module 210 may permit use and operation of one more of: a keyboard, keypad, touch-screen, mouse, joystick, light pen, or other peripheral devices for receiving inputs from a user. Similarly, the application may output information and data to the user, for example, via a printer or other peripheral device (e.g., external storage device or networked devices).

The graphical user interface module 210 may interact with a computer's operating system and/or one or more other software applications. In one implementation, application 205 may comprise a stand-alone software application running on a computer, printing system, or other machine. Alternatively, a server (not shown) may host the application 205, which may, in some implementations require a user to access the server over a network to use the application. In some implementations, a user may download the application 205 from a server, with program updates made available (over the network or the Internet) as needed, or on a predetermined, regularly-scheduled basis. The application 205 may be operated in a Microsoft Windows® operating environment. However, other operating systems and environments (e.g., UNIX, Linux, and proprietary systems, such as Apple Mac OS X) are also envisioned.

The spot color selection module 220 provides the user with capabilities to select one or more spot colors. For instance, the module 220 may display, in the graphical user interface, information regarding one or more spot colors for which the user may "tag" or otherwise select for consideration. An input device may be used by the user to do so.

The color selection module 220 may interface with at least one spot color database 225, which stores or maintains color palettes, libraries, collections, and/or other information regarding spot colors. The spot color database 225 could be in some implementations located remotely from the application 205 and interface, for example, via a network. In one implementation, the spot color selection module 220 may also permit users to create new spot color entries and save and edit entries in the spot color database 225.

The illuminant selection module 230 provides the user with capabilities to select one or more light sources for consideration. For instance, the module 230 may display, in the graphical user interface, information regarding light sources and illuminants for which the user may "tag" or otherwise select for consideration. The illuminant selection module 230 may interface with at least one illuminant database 235, which store or maintains spectral data for one or more light sources.

There is a variety of light sources available in the market. See, e.g., "Explanation of Various Light Sources and Their Use in Visual Color Matching Applications," GTI Graphic Technology, Inc., herein incorporated by reference in its entirety. Some of the light sources may comply with CIE ratings and/or have the ability to reproduce daylight in both visible and ultraviolet spectrums. Spectral models of the light sources based on color temperature are also available. In addition to collecting the spectra for known light sources, light measurement sensors may be to determine the spectra for non-standard light sources.

Many retail companies such as, for example, Wal-Mart, Target, Sears, and Home-Depot, have established specifications for the light sources used in their stores. Collecting various spectra may be done as a one-time process. Existing entries may be subsequently modified and/or new entries may be added to the illuminant database 235, as desired.

Other spectral distribution data may be obtained from various resources. For example, many light source manufacturers may provide spectral distribution information on their products. Alternatively or additionally, spectral data may be collected empirically, for example, using an illuminant sensor, if the spectral distribution information, is not otherwise available.

The gamut mapping module 240 is configured to provide the user with capabilities to select one or more gamut mapping techniques for consideration. For instance, the module 240 may display, in the graphical user interface, information regarding gamut mapping techniques for which the user may "tag" or otherwise select for consideration. The gamut mapping module 240 may interface with at least one gamut mapping technique database 245, which store or maintains gamut mapping technique database 245. The gamut mapping technique database 245 stores a plurality of gamut mapping techniques and/or strategy. Existing entries may be subsequently modified and/or new entries may be added to gamut mapping technique database 245, as desired.

The device specific recipe module 250 interfaces with the printing system 270 and is configured to generate nominal device recipe information for printing spot colors with the printing system 270. This module 250 may initiate commands to the printing system 270 to render one or more test patterns or patches corresponding to the nominal device recipe information.

The printing system 270 may include any printing engine capable of color printing technology such as, for example, ink-jet (bubble jet), laser, offset, solid-ink, dye sublimation, xerography, etc., in which color is rendered by using a plurality of process colors (e.g., CMYK). In some implementations, the color sensor 280 may be used in conjunction with the printing system 270, such as an embedded or inline spectrophotometer (ILS).

The color sensor 280 is configured to measure a color value printed test patterns. Spectra from color test patterns and patches printed by the printing system 270 may be measured, in some implementations, using a spectrophotometer using a broadband illumination source, such as, a fluorescent lamp. See, for example, U.S. Pat. No. 6,639,669, herein incorporated by reference in its entirety. The color sensor 280 might also be separate or offline from the printing system 270.

Any description herein of measuring or using spectral data for color values, however, should not be construed as limiting. It will be appreciated that color measurements may be performed using other techniques and/or devices. For example, Trichometric quantities (e.g., $L^*a^*b^*$, XYZ, LHC) may be used for representing color in three coordinate space through some type of transformation, rather than spectral data. Thus, instead of using a spectral sensor, the color sensor 280 may be a color scanner or colorimeter, which may contain an illuminant specific transformation look up table (LUT), such as RGB to $L^*a^*b^*$, that can supply $L^*a^*b^*$ values specific to an illuminant type. Trichometric quantities may therefore be used for color comparison, alternatively or in addition to, to spectral data in the various disclosed embodiments.

The recipe optimizer module 260 is configured to determine an optimal recipe for each spot color under various illuminants considered. This module 260 may be used for performing one or more methods for adaptive illumination independent matching of one or more spot colors in accordance with embodiments disclosed herein. For instance, an iterative process may be utilized until the target and measured spectral values satisfactorily converge to within a predetermined tolerance.

In one implementation, the color dispersion may be measured as a statistically significant color dispersion. For example, the average delta-E 1976 and/or average delta-E 2000, and/or the $95^{th}$ percentile may be determined, wherein multiple iterations are carried out to converge to a single recipe at a particular illuminant.

The optimized recipe information for spot colors under various illuminants under consideration may be stored or maintained on an adaptive illumination independent spot color matching database 265. In other implementations, though, the optimized recipe data may be stored or maintained alternatively or additional, in the spot color database 225 or the illuminant database 235. In fact, in some implementations, the databases and information stored therein may be combined.

The optimized recipe information may then be transmitted to a color management profile in the memory of the printing system 270. When desired, the printing system may print or display a spot color using the optimized recipe information.

In addition, the module 260 may automatically choose and/or recommend the optimal recipe and gamut mapping technique that provides lowest color dispersion across a variety of spectra under consideration. Results may be displayed in the display device of the graphical user interface.

An illumination sensor 290 may also be provided. For instance, a Model LUX LITE Visible radiation sensor manufactured by Kipp & Zonen, B. V., and distributed by Climatronics Corp. This particular sensor has a spectral characteristic, which is in accordance with the CIE (Comimission International d'Eclairage) requirements. This sensor includes a photodiode sensor and a filter which provides a spectral response similar to that of the average human eye. Although, it will be appreciated that other color and spectral sensors may also be used. The location and distance from the light source may vary depending on the light source and/or environ.

Figure 3:
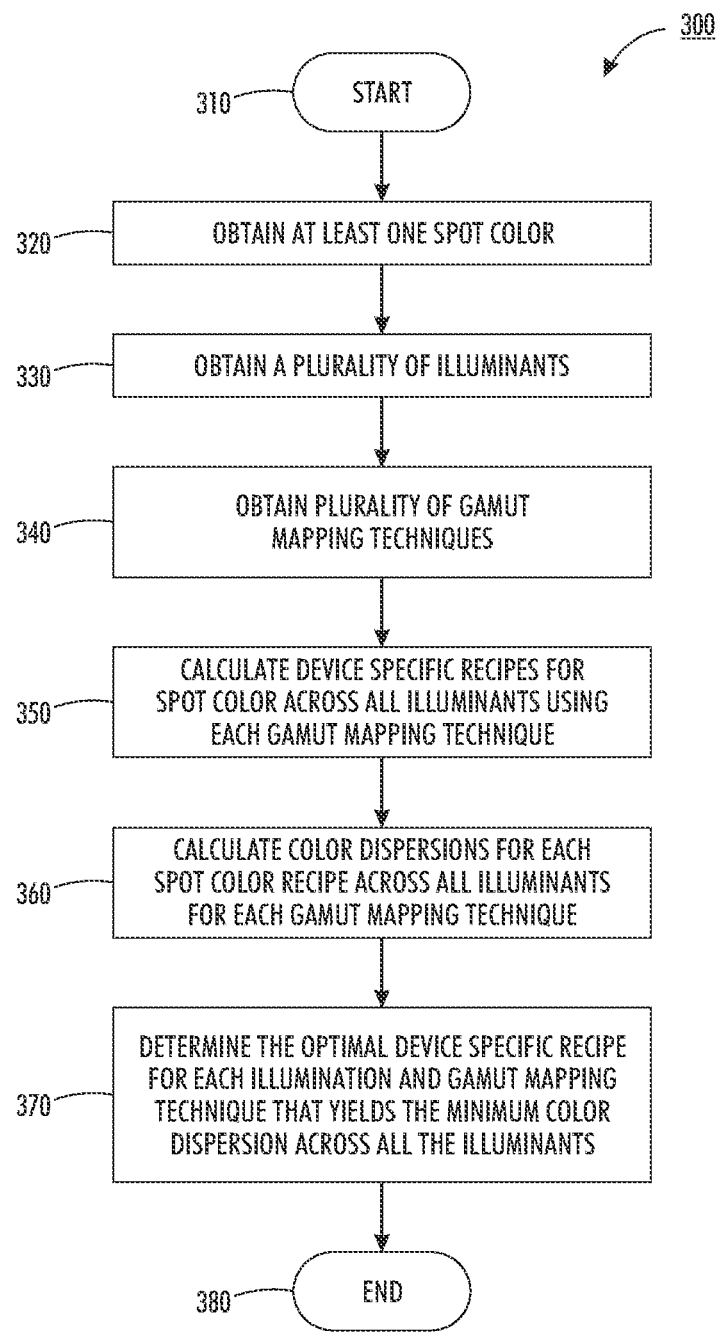
FIG. 3 shows an exemplary method for adaptive illumination independent matching of one or more spot colors according to an embodiment.

FIG. 3 shows an exemplary method 300 for adaptive illumination independent matching of one or more spot colors according to an embodiment.

The method begins in step 310. In step 320, spectra for a spot color is obtained. Each spot color, depending on the industry, proprietary, and/or organizational system, has a characteristic spectra. Typically, the spot color may be described as being within a color space such as a reflectance (or transmittance) spectra over the visible light spectrum, or as other color values (e.g., L*a*b*, XYZ, LHC, CMYK, RGB, or sRGB). These color values may be retrieved from a spot color database 225 or otherwise provided. As noted above, these values are generally provided for only a 2 degree observer and a D50 light source. One or more spot colors may be selected by a user for consideration via spot color selection module 220. If multiple spot colors are selected, the method uses either first or next selected spot color.

In step 330, illuminant spectra for a plurality of illuminants are obtained. Illuminant spectral data may be stored in one or more illuminant databases 235 and one or more illuminants may be selected by the user via illuminant selection module 230. In some implementations, all light sources in the illuminant database will be considered, although, it will be appreciated that not all illuminant spectra in the illuminant database(s) 235 need to be utilized. For instance, a user may select a plurality of light sources (or spectra), from the illuminant spectra database 235 for consideration. In some implementations, the illuminant spectra may be measured in situ, using the illumination sensor 290 (FIG. 2).

Next in step 340, a plurality of gamut mapping techniques are obtained. For instance, the gamut mapping techniques may be stored in one or more gamut mapping technique databases 245 and one or more gamut mapping techniques may be selected by the user via the gamut mapping module 240. In some implementations, all gamut mapping techniques in the gamut mapping technique database will be considered, although, it will be appreciated that not all gamut mapping techniques in the gamut mapping techniques database(s) 245 need to be utilized. For instance, a user may select a plurality of gamut mapping techniques from the gamut mapping techniques database 245 for consideration.

In one implementation, multiple gamut mapping techniques may be considered. These may include, for example, the Nearest, delta-E2000, chromatic, and cusp gamut mapping techniques, as discussed in the references mentioned above. Of course, other gamut mapping techniques are also possible. Thus, any reference herein to a particular gamut mapping technique should not be construed as limiting.

In step 350, a specific gamut mapped device recipe for the selected spot color is calculated for each of the set of illuminants using each of the set of gamut mapping techniques under consideration. One implementation of this process is disclosed in more detail in FIG. 4.

The spot color spectra may be converted to an illuminant specific target value for each of the illuminants using each of gamut mapping techniques under consideration. In one implementation, the target values may be CIE L*a*b* values. This may be performed, for instance, using an ICC profile. Then device specific recipes are calculated corresponding to the target values for the particular printing system for each illuminant using each of the gamut mapping techniques.

Using the printing system 270 (FIG. 2), test patterns having the device specific recipes are printed and measured with the color sensor 280 to determine their spectral profile.

If the color dispersion between the target values and the measured values of the test pattern for a particular illuminant is within a predetermined tolerance, that recipe is kept. Otherwise, the recipe is altered. For example, delta-E 1976 and/or delta-E 2000 values may be calculated for the color differences between the target values and the measured values. Step 350 may continue multiple times, as needed, until the target and measured values for that illuminant satisfactorily converge to within a predetermined tolerance.

In step 360, for each of the device specific recipes obtained in step 350, color dispersion values may be calculated for that same specific device for all the remaining illuminants using each of gamut mapping techniques under consideration (other than the particular illuminant used to determine the device specific recipe in step 350). One implementation of this process is disclosed in more detail in FIG. 5.

In some implementations, a Color Inconstancy Index (CII) may be used to measure the extent of color inconstancy of a sample under different illuminants. The Color Inconstancy Index is the total color difference for a sample between reference illuminant and other testing illuminants. Using ASCE or other spot color recipe search methods for the printing system one can obtain a set of colorants such as CMYK that best match the reference color under the reference illuminant. A simplified CII may be calculated as the color difference between reference and testing illuminants using any color difference equation. For example, the CII for sample #1 between D50 light source and D65 light source can be written as:

$$CII = \sqrt{(L_{D50\_Sample1} - L_{D65\_Sample1})^2 + (a_{D50\_Sample1} - a_{D65\_Sample1})^2 + (b_{D50\_Sample1} - b_{D65\_Sample1})^2}$$

where L, a and b values correspond to L*, a* and b* values with suffixes corresponding to D50 illuminant and D65 illuminant for sample 1. Color inconstancy indicates the degree to which the appearance of sample's color changes when the illuminant is changed. Color inconstancy may be determined by measuring the sample with an instrument under different illuminants and then performing mathematical calculations.

Figure 1A:
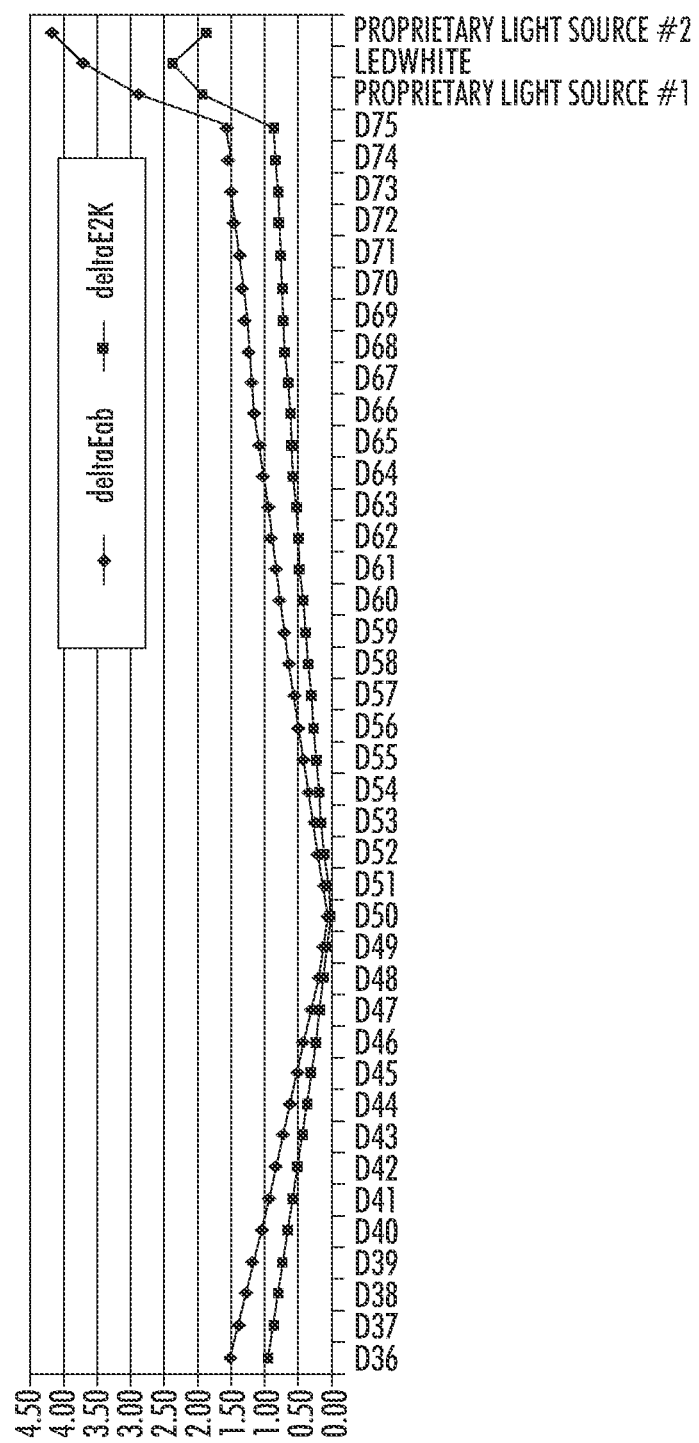
FIGS. 1(a)-(c) show color variations for various spot color under multiple illuminants.
Figure 1B:
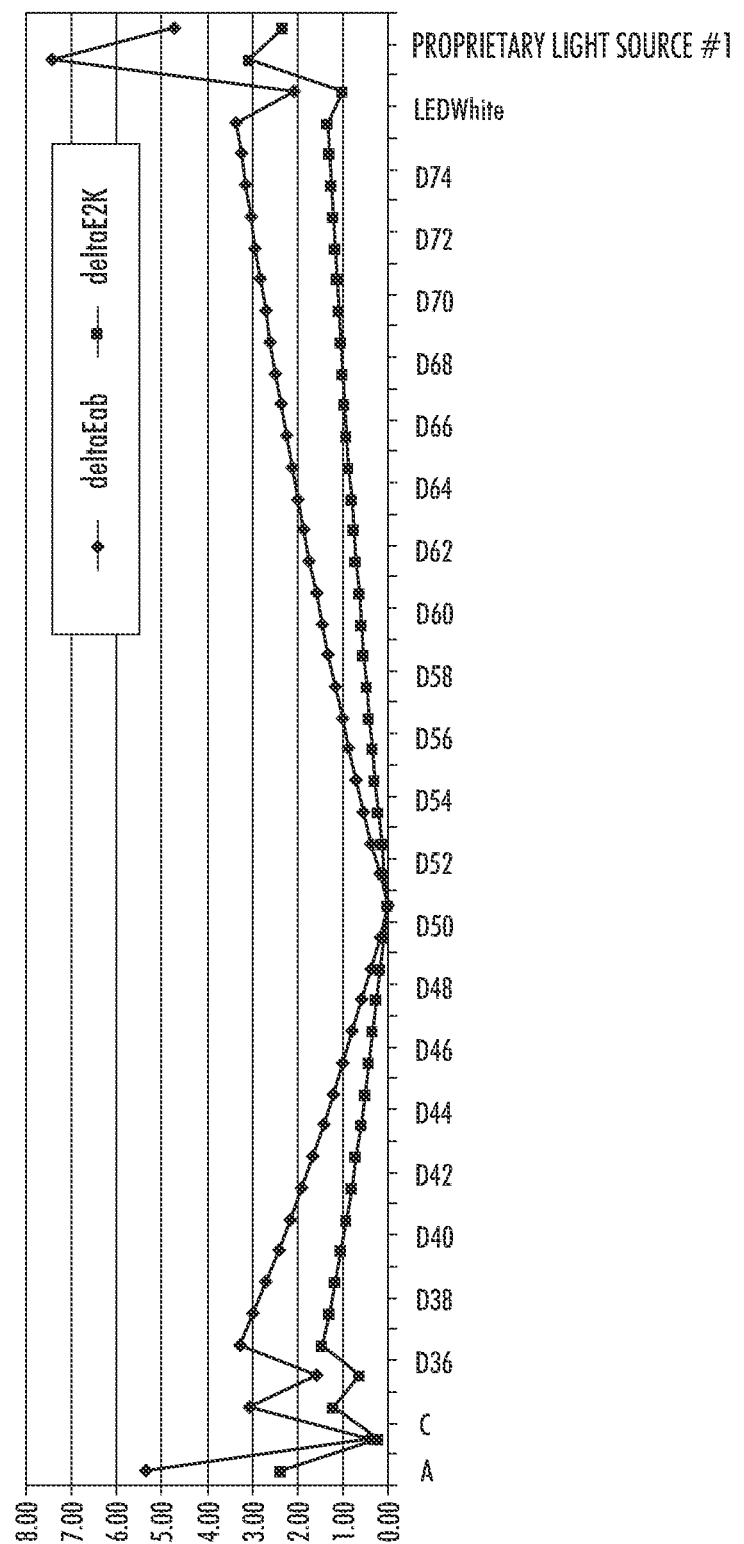
Figure 1C:
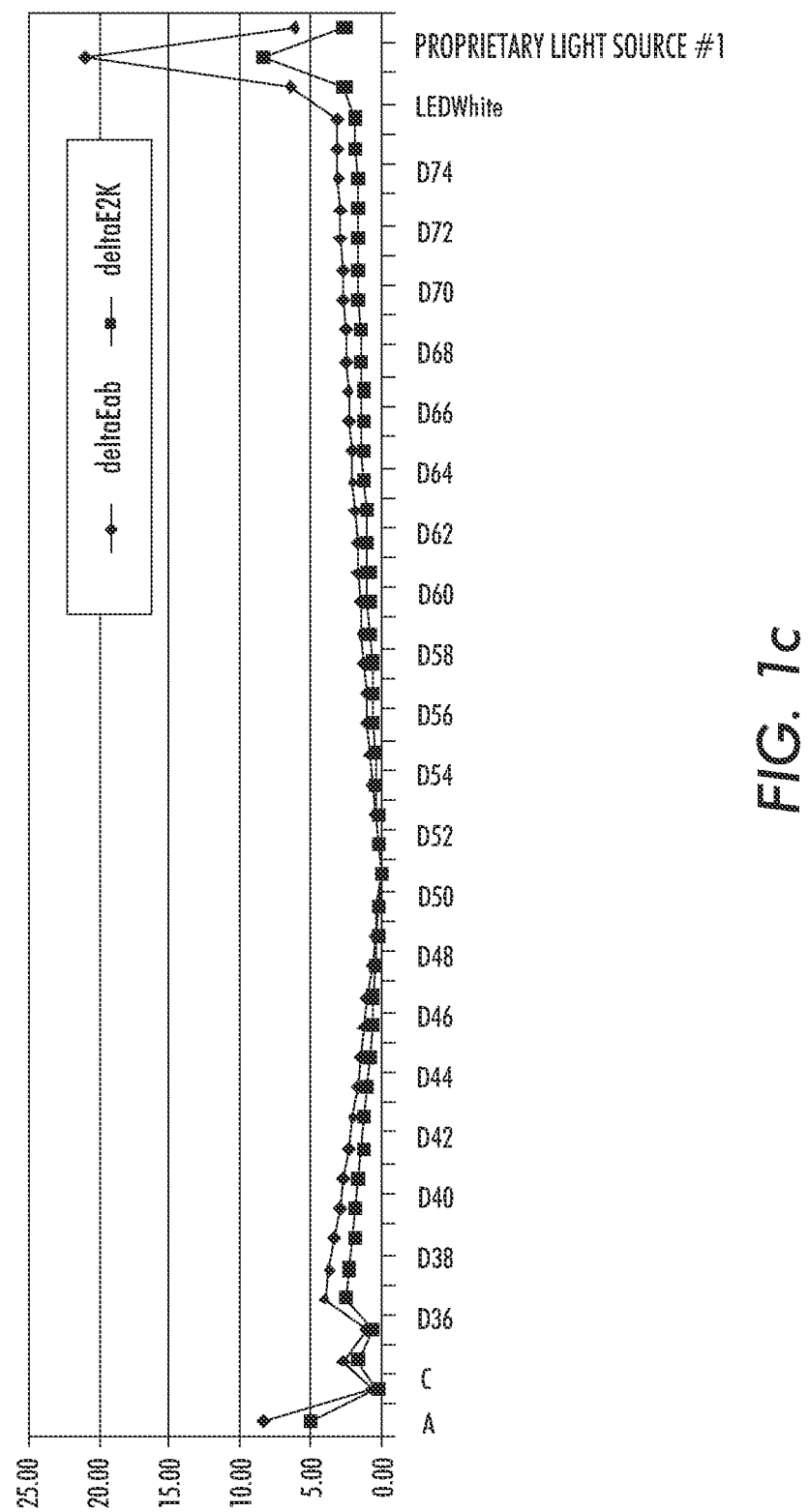

As another example of the color dispersion value, the spectra of a reference color such as a Pantone® color is used to calculate the target L*a*b* value under a reference illuminant and an observer angle. Using ASCE or other spot color recipe search methods for the printing system one can obtain a set of colorants such as CMYK to best match the target L*a*b* under the reference illuminant and the observer angle. When viewed under a different illuminant or a different observer angle, the spot color from the printing system may deviate from the reference color. This deviation or color dispersion can be referred to as the Reference Color Difference Quantity (RCDQ). Mathematically the CIE deltaE version of the RCDQ is $$RCDQ(I_R, I) = \sqrt{\begin{array}{l}(L_I(sp_R) - L_I(CMYK_{I_R}))^2 + \\ (a_I(sp_R) - a_I(CMYK_{I_R}))^2 + \\ (b_I(sp_R) - b_I(CMYK_{I_R}))^2\end{array}}$$

and the deltaE2000 version of the RCDQ is $$RCDQ(I_R,I)=deltaE2000[L_I(sp_R)a_I(sp_R)b_I(sp_R),L_I(CMYK_{I_R})a_I(CMYK_{I_R})b_I(CMYK_{I_R})]$$

where I stands for the illuminant under consideration, $I_R$ stands for the reference illuminant, $sp_R$ is the spectra of the reference color, and $CMYK_{I_R}$ is the CMYK value obtained by the spot color recipe search methods that best match the reference color under the reference illuminant. For example, if $I_R$ is chosen as the D50 illuminant, then $L_I(CMYK_{I_R})$ is the L* value of the measured spot color for illuminant I (D65, D75 etc.,) which is produced with a recipe ($CMYK_{I_R}$) at D50 illuminant. $L_I(sp_R)$ is the target L* value of the target spot color spectra under illuminant I. Similarly a* and b* values are calculated and RCDQ numbers are obtained corresponding to those illuminants. The RCDQ value measures the ability of the printing system to re-produce colors under various illuminant condition which is expressed using well known color difference equations such as CIELab or deltaE2000. For example, if $CMYK_{I_R}$ of the printing system produces the spectra that matches exactly $sp_R$ (i.e., with zero deltaE) then RCDQ will be zero under any illuminant condition. In our implementation (for example in FIG. 1a), for variety of illuminants RCDQ numbers are obtained with D50 illuminant as the reference light source at fixed observer angle of 2 degrees. A maximum or average RCDQ number is obtained from these calculations for the reference illuminant to understand sample's color dispersion value across different illuminants. These calculations are then done across remaining illuminants with second illuminant as the reference (e.g., D65). One RCDQ number may be obtained for the second reference illuminant. Repeating these calculations across the remaining illuminants with one of them as the reference each time gives sample's color dispersion value (average or maximum RCDQ number) across variety of illuminants in the database.

In addition, the color dispersion value may be, in some implementations, expressed as another well known quantity called a Metameric Index, which is a single-number index which indicates how well two materials (for example, two spectra; target spectra and measured spectra) match under two different illuminants. The spectral curves of two closely matching, non-metameric samples are nearly identical. Metameric index is used to measure the degree of metamerism. It is calculated with respect to two different illuminants. Metamerism Index is based on Hunter L,a,b values and is shown below $$MI=\sqrt{(\Delta L_{n1}-\Delta L_{n2})^2+(\Delta a_{n1}-\Delta a_{n2})^2+(\Delta b_{n1}-\Delta b_{n2})^2}$$

where $n_1$ is the first illuminant and $n_2$ is the second illuminant and $\Delta$=Value$_{target}$-Value$_{measured}$. For example, L* differences between two illuminants can be calculated as: $\Delta L_{n1}* = (L_{target}*-L_{measured}*)_{n1}$ for first illuminant and $\Delta L_{n2}* = (L_{target}*-L_{measured}*)_{n2}$ for second illuminant. Similarly a* differences and b* differences can be calculated for two different illuminants. The metameric index represents how well the colors are spectrally matched for two different illuminants. As in this specification, the target spot color spectra and the measured spectra obtained after using the best color recipe can be used as samples to see how well they are spectrally matched (or reproduced for minimizing metameric index). When the measured spectra perfectly matches with the target spectra, the metameric index will be zero. This may not be true in practice due to limited choice of device specific recipe (or colorants).

In step 370, the optimal device specific recipe for each spot color and gamut mapping technique that yields the minimum color dispersion across all the illuminants sampled is determined. For instance, this may be the recipe that gives the minimum delta-E variation across the plurality of illuminants considered. The method ends in step 380.

In one implementation, the illumination sensor 290 (FIG. 2) may be used to provide the best color matching using illuminant spectral distribution measured directly from a light source. The illumination sensor 290 may be used to directly measure lighting in situ to obtain a spectra (or a color value) in step 330. For instance, the illumination sensor 290 may be located in a room or other environ in which the spot color is typically viewed. The location and distance from the light source may vary depending on the light source and/or environ.

In addition, depending on the particular gamut mapping technique under consideration, there may be a set of parameters k used for that gamut mapping technique. Thus, in some implementations, the set of parameters k may be optimized so as to determine the optimal set of parameters k* that yields the lowest color dispersion across the plurality of illuminants. For instance, in step 350, the specific gamut mapped device recipe for the selected spot color is calculated for each of the set of illuminants using each of the set of gamut mapping techniques under consideration, while taking in account the set of parameters k for each technique.

A "brute force" approach could be used to determine the optimal parameter k* if the computation time is not a constraint. Otherwise, the optimization can be carried out using known methods described, for example, in M. Srinivas and L. M. Patnaik, "Genetic algorithms: A survey," *IEEE Computer Magazine*, pp. 17-26, June 1994; J. A. Nelder and R. Mead, "A simplex method for function optimization," *Computer Journal*, 7: 303-313, 1965; and V. Torzcon, "On the convergences of the multidirectional search algorithm," *SIAM Journal Optimization*, (1)1: 123-145, February 1991, herein incorporated by reference in their entireties.

Figure 4:
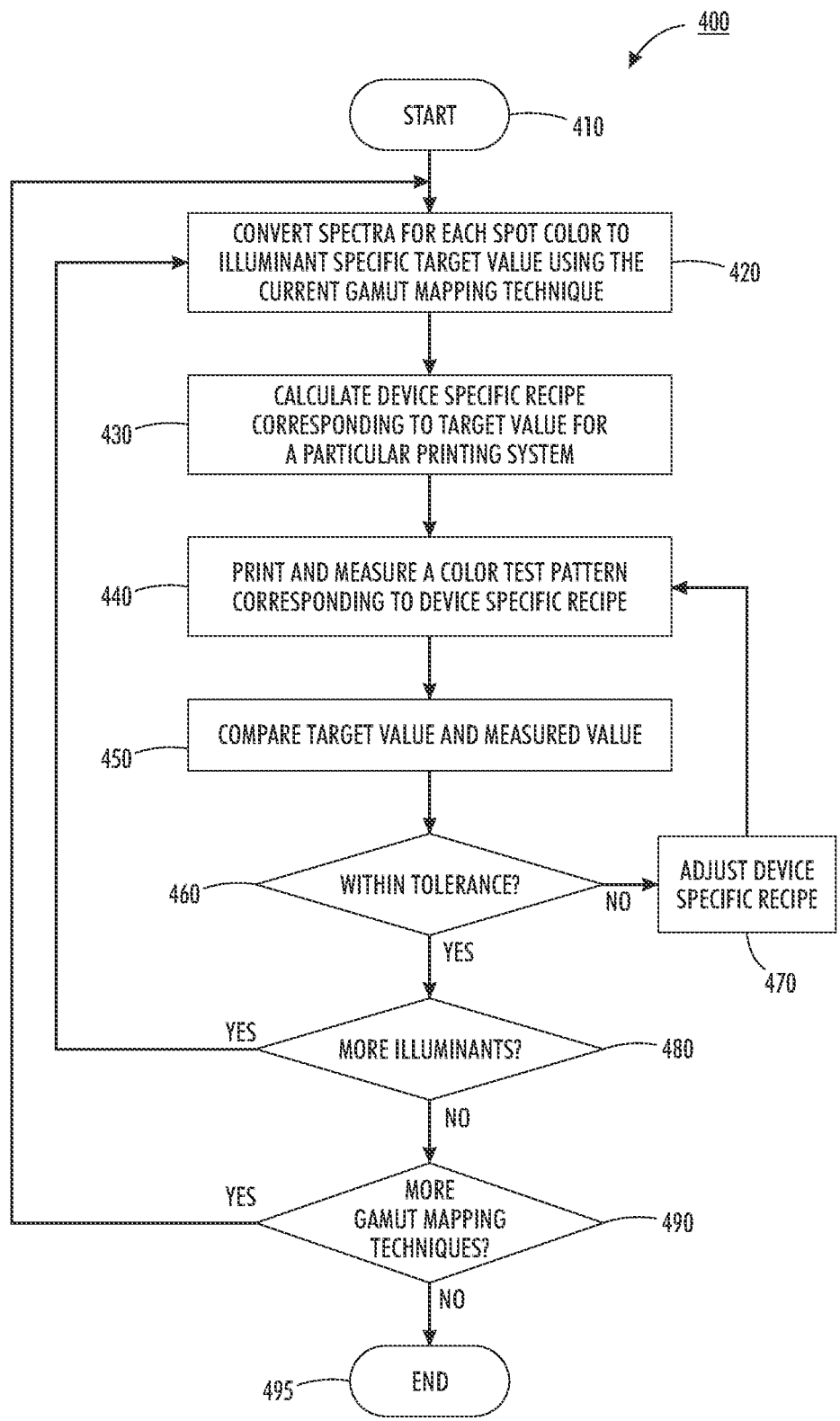
FIG. 4 shows an exemplary method for determining device specific recipes for a spot color according to an embodiment.

FIG. 4 shows an exemplary method 400 for determining device specific recipes for a spot color according to an embodiment. This method is one implementation of step 350 in FIG. 3.

The method begins in step 410. In step 420, a spot color spectra is converted to an illuminant specific target value for an illuminant using the current gamut mapping technique under consideration. In one implementation, the target values may be CIE L*a*b* values. This may be performed, for instance, using an International Color Consortium (ICC) profile.

In one implementation, CIE XYZ color space may be first determined, according to equations (1) to (3), below:

$$X = 100 \frac{\sum_{k=0}^{N-1} \overline{X}(\lambda_k)R(\lambda_k)l(\lambda_k)}{\sum_{k=0}^{N-1} \overline{Y}(\lambda_k)l(\lambda_k)} \quad (1)$$

$$Y = 100 \frac{\sum_{k=0}^{N-1} \overline{Y}(\lambda_k) R(\lambda_k) l(\lambda_k)}{\sum_{k=0}^{N-1} \overline{Y}(\lambda_k) l(\lambda_k)} \quad (2)$$

$$Z = 100 \frac{\sum_{k=0}^{N-1} \overline{Z}(\lambda_k) R(\lambda_k) l(\lambda_k)}{\sum_{k=0}^{N-1} \overline{Y}(\lambda_k) l(\lambda_k)} \quad (3)$$

In the above equations, $\overline{X}(\lambda)$, $\overline{Y}(\lambda)$, and $\overline{Z}(\lambda)$ are the CIE color matching functions, $R(\lambda)$ is the reflectance spectra of the measured test pattern for the spot, and $l(\lambda)$ is the spectra of the desired light source.

The CIE L*a*b* color space values may then be obtained from CIE XYZ using the nonlinear transformations according to equations (4)-(6):

$$L^* = 116 f\left(\frac{Y}{Y_n}\right) - 16 \quad (4)$$

$$a^* = 500\left[f\left(\frac{X}{X_n}\right) - f\left(\frac{Y}{Y_n}\right)\right] \quad (5)$$

$$b^* = 200\left[f\left(\frac{Y}{Y_n}\right) - f\left(\frac{Z}{Z_n}\right)\right] \quad (6)$$

where $$f(x) = \begin{cases} x^{\frac{1}{3}} & x \geq 0.008856 \\ 7.787 x + \frac{16}{116} & x \leq 0.008856 \end{cases}$$

and $X_n$, $Y_n$, and $Z_n$ are tristimulus values of a reference white point. For additional information regarding such conversions, see for example, Appendix A of L. K. Mestha and S. A. Dianat, Control of Color Imaging Systems, Publisher: CRC Press, ISBN 978-0-8493-3746-8, May 2009, herein incorporated by reference in its entirety.

While CIE LAB color space is disclosed, it will be appreciated that other device-independent color spaces may be similarly used, such as, for example, CIE L*u*v*, LCH, etc.

Continuing to step 430, the device specific recipes are calculated corresponding to the target values for the particular printing system. For example, an ICC inverse printer model or look up table (LUT) may be used. The device specific recipe may include the constituent proportions of the process colors, which the printing system uses in color printing. In four-color printing, typically cyan, magenta, yellow and black (CMYK) colorants are used. In some implementations, additional process colors may also be used, such as orange (O) and/or violet (V). Although, it will be appreciated that the number of process colors may vary by the manufacturer, and/or the printer operator.

In step 440, at least one color test pattern corresponding to the device specific recipe, which was calculated in step 430, is printed and measured. In one implementation, the color test pattern may be printed as a solid-high density test patch, for instance a 1×1 inch square at high density (e.g., 100% toner area coverage). Other test pattern configurations are also possible.

The printed test pattern is measured using the color sensor 280 (FIG. 2) in step 440. As previously discussed, the color sensor 280 may be inline or embedded within the printing system 270. Thus, printing and measuring may be performed together in an automated manner to increase efficiency. Alternatively, the color sensor could be separate or offline with respect to the printing system 270.

Next, in step 450, the target value and the measured value for the spot color are compared. For example, delta-E 1976 and/or delta-E 2000 values may be calculated for the color difference between the target values and the measured values.

A determination is made, in step 460, to see if the error between the target value and the measured value of the test pattern is within a predetermined tolerance (e.g., 1.5 delta-E2000).

If not, then the recipe may be adjusted in step 470 and the process returns to step 440. In one implementation, the Xerox Corp. "Automated Spot Color Editing (ASCE)" control process may be used. Details of this process are disclosed in U.S. Pat. No. 6,744,531, herein incorporated by reference in its entirety. This iterative process may be used to vary the device specific recipe until the error between the target value and the measured value is within a predetermined value. For example, steps 440 to 460 may be repeated, as necessary, until target value and the measured value of the test pattern is within the predetermined tolerance. Otherwise, the process continues to step 480. It will be appreciated that other device specific recipe adjustment models may be similarly used.

In step 480, a determination is made whether there are more illuminants to consider. If yes, the process returns to 420. Steps 420 to 480 may be repeated, as necessary, for each illuminant for the current gamut mapping technique under consideration. If not, the process proceeds to step 490.

Next in step 490, a determination is made whether there are more gamut mapping techniques to consider. If yes, the process returns to 420. If not the process ends in step 495. Upon completion of method 400, device specific recipes will have been determined for each or the illuminants using each of the gamut mapping techniques under consideration.

It will be appreciated that while FIG. 4 shows a sequential process for determining device specific recipes for a spot color for each illuminant, that in other implementations, this could be performed in parallel, with the printing and measuring of multiple test patterns for various illuminant specific values occurring at substantially the same time.

Figure 5:
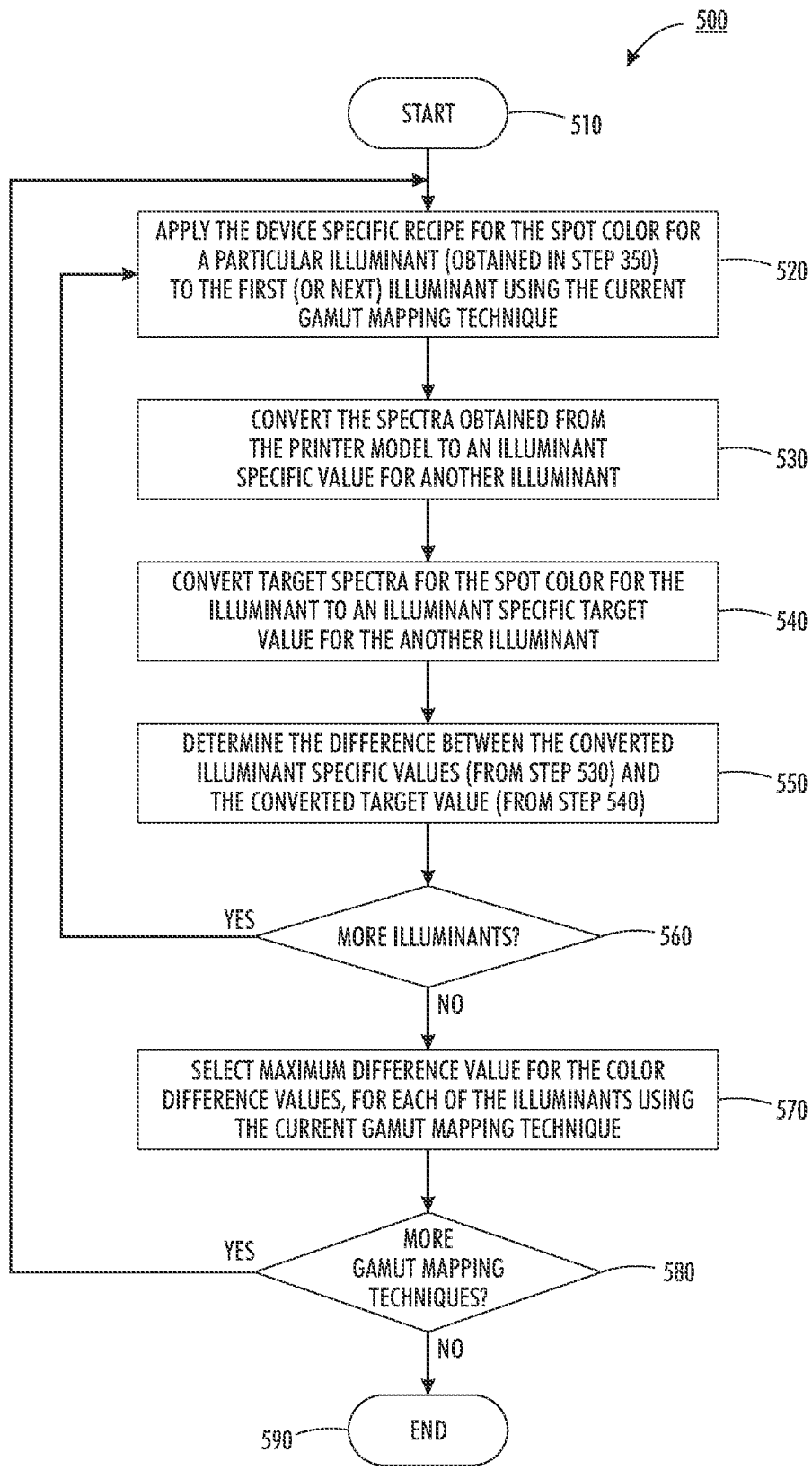
FIG. 5 shows an exemplary method for calculating maximum color dispersion values for all illuminants according to an embodiment.

FIG. 5 shows an exemplary method 500 for calculating maximum color dispersion values for all illuminants using each gamut mapping technique according to an embodiment. This is one implementation of step 360 in FIG. 3.

The method begins in step 510. In step 520, the device specific recipes for the spot color for a particular illuminant (obtained in step 350) using the current gamut mapping technique is then applied to a next illuminant among the remaining illuminants. The spectra corresponding to the device specific recipe may be determined using the printer model for the device specific recipe.

Next in step 530, the spectra obtained from the printer model in step 520 is converted to an illuminant specific L*a*b* value for the other illuminant, for example, using equations (1)-(6), discuss above.

Similarly, in step 540, the target spectra for the spot color under the illuminant considered (also obtained in step 420) is similarly converted to an illuminant specific target value for the another illuminant, for example, using equations (1)-(6).

In step 550, the difference between the converted illuminant specific values (from step 530) and the converted target value (from step 540) is determined, for example, in delta-E1976 and/or delta-E2000.

Next in step 560, a determination is made whether there are more illuminants to consider. If yes, the process returns to 520. If not, the process goes to step 570, where the maximum difference value is selected for the color difference values, for example, in delta-E1976 and/or delta-E2000, for each of the illuminants using the current mapping technique.

Continuing to step 580, a determination is made whether there are more gamut mapping techniques to consider. If yes, the process returns to 520. Steps 520 to 580 may be repeated, as necessary, in order to determine the maximum difference values for the color difference values, for each of the illuminants using all gamut mapping techniques. If not, the process ends in step 590.

The following results were obtained with an illuminant database containing different illuminants. These include illuminants such as A, B, C, E and D36 to D75, White LED, and the fluorescent lamps Proprietary light source #2 and Proprietary light source #1.

Two spot colors, Pantone® 251C and 3385C, were used. The printer was an Xerox Corporation iGen3® which was modeled using spectral Neugebauer printer model. A four-color CMYK printer gamut with four gamut mapping techniques (Nearest, delta-E2000, chromatic, and cusp) were considered. The "range" and "hue range" parameters were set at 0.8 and 4.0, respectively for the last two gamut mapping techniques.

Figure 6A:
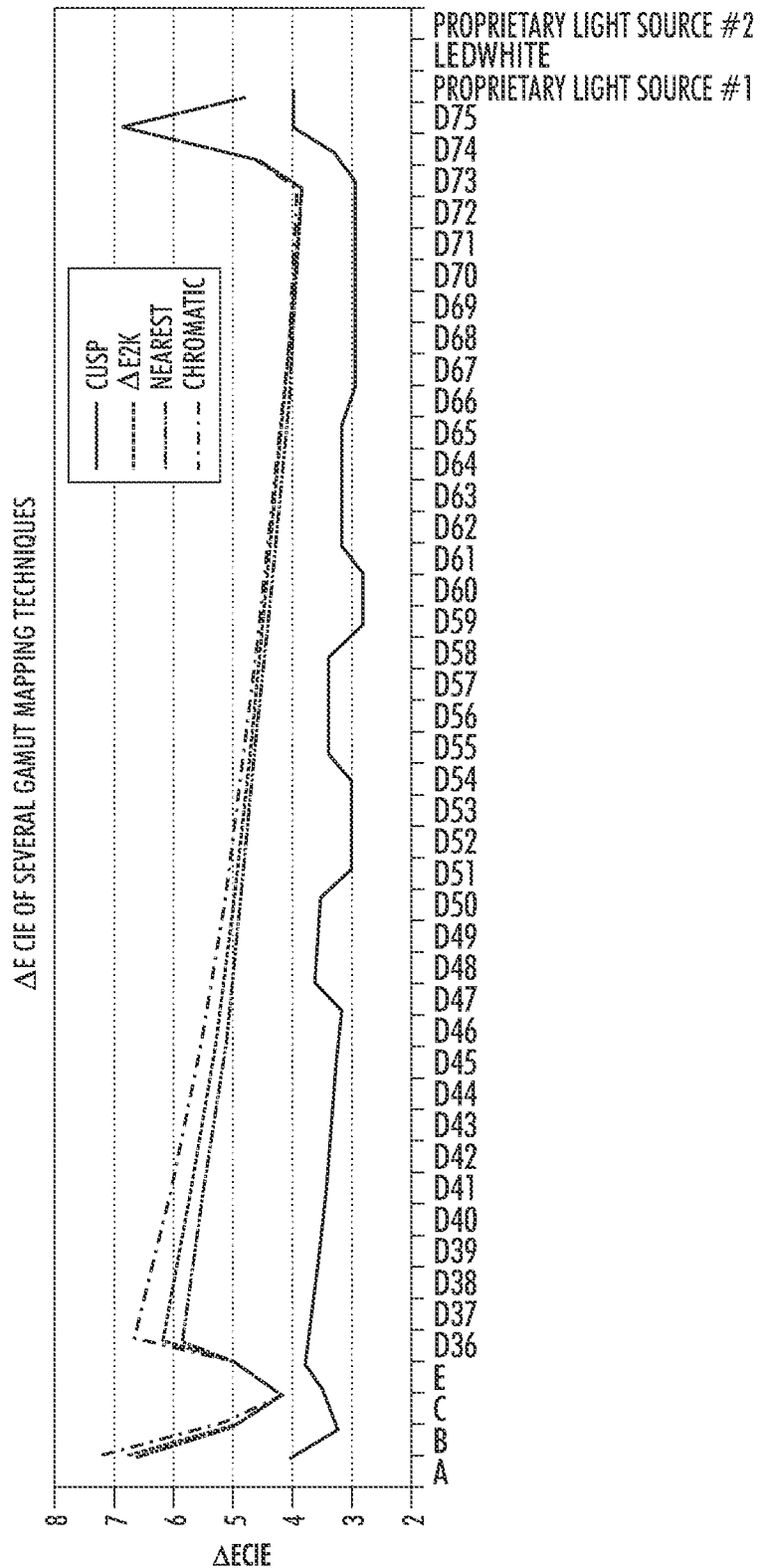
FIGS. 6(a) and (b) show results for the Pantone® 251C spot color with the color variations in delta-E 1976 and delta-E2000, respectively.
Figure 6B:
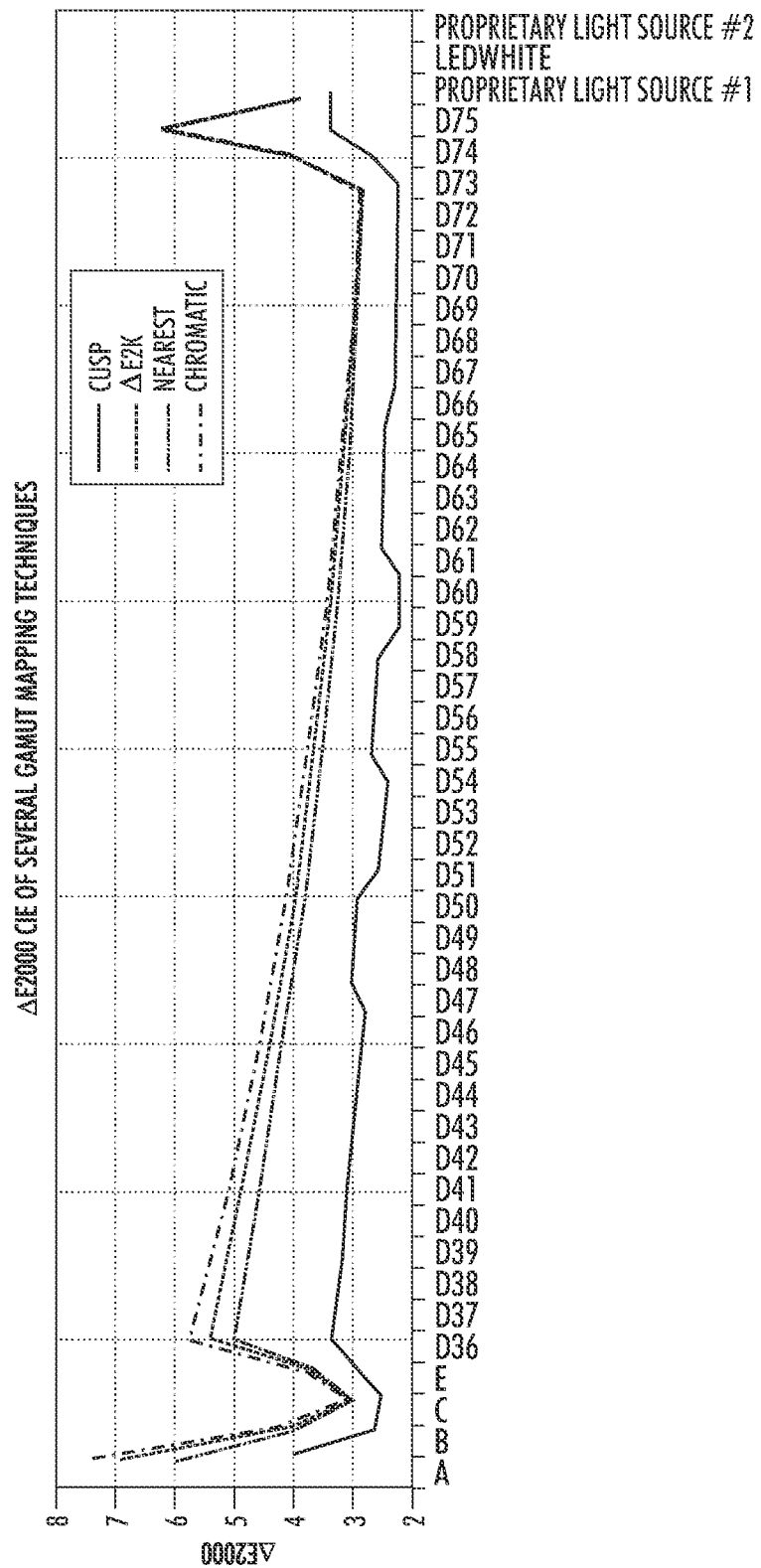

FIGS. 6 (*a*) and (*b*) show delta-E1976 and delta-E2000 performance values for the Pantone® 251C spot color for each of the illuminants using the Nearest, delta-E2000, chromatic, and cusp gamut mapping techniques.

The recipe with the smallest color dispersion will provide the least color variation under a variety of illumination (i.e., viewing) conditions and gamut mapping. For the delta-E1976 scenario, the delta-E2000 gamut mapping technique with the D62 illuminant is the best selection. The corresponding recipe is about CMYK=[191 143 255 255].

On the other hand, for the delta-E2000 scenario, the delta-E2000 gamut mapping technique with the D75 illuminant is the best selection. Its corresponding colorant recipe is about CMYK=[195 139 255 255].

Figure 7A:
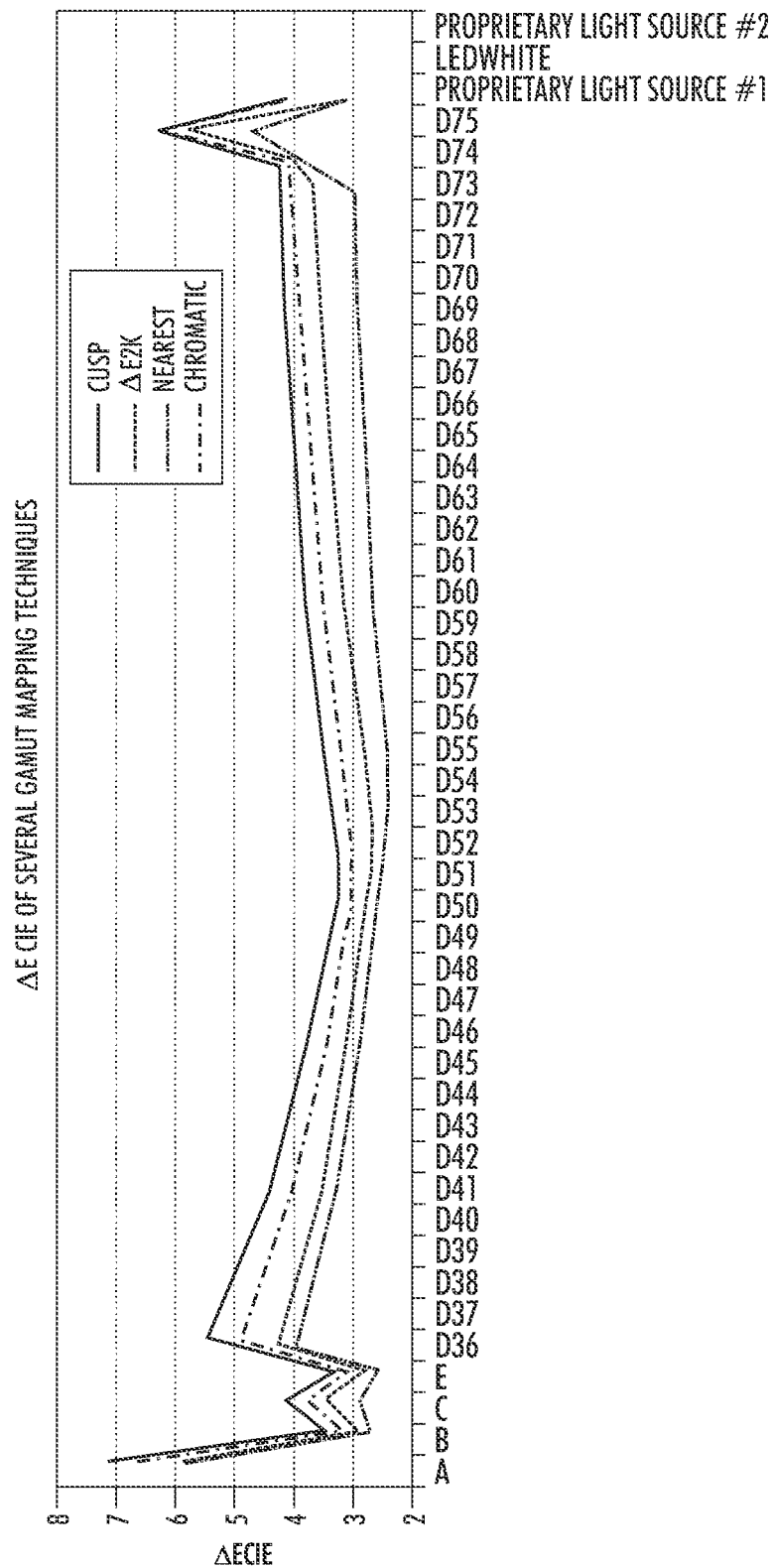
FIGS. 7A and 7B show results for the Pantone® 3385C spot color with the color variations in delta-E 1976 and delta-E2000, respectively.
Figure 7B:
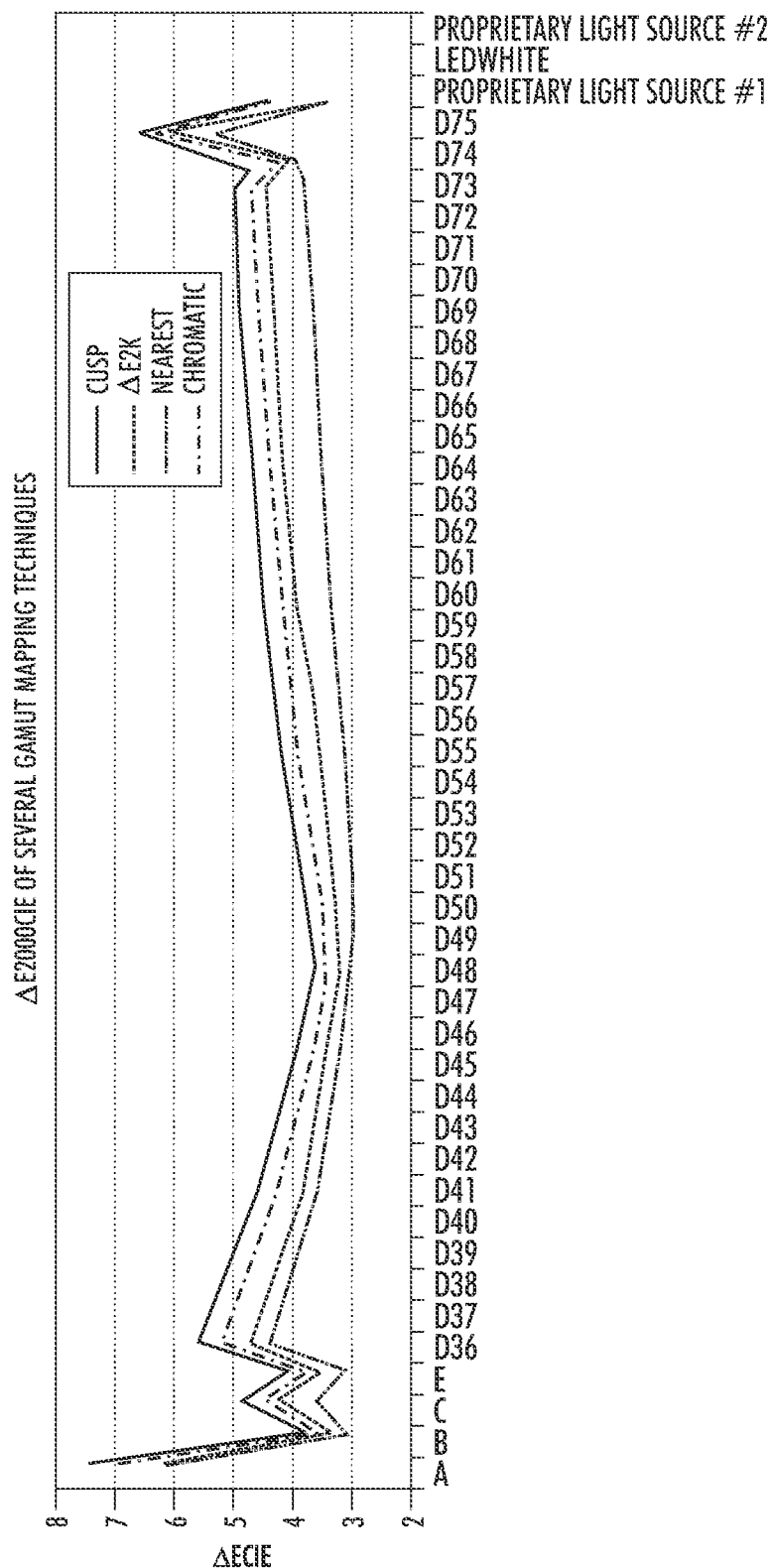

FIGS. 7 (*a*) and (*b*) show delta-E1976 and delta-E2000 performance values for the Pantone® 3385C spot color for each of the illuminants in the illuminant database using a variety of gamut mapping techniques.

For the delta-E1976 scenario, the cusp gamut mapping with the D55 illuminant is the best selection. The corresponding colorant recipe is about CMYK =[126 255 168 255]. And for the delta-E2000 scenario, the cusp gamut mapping technique with the D51 illuminant is the best selection. Its corresponding colorant recipe is about CMYK=[125 255 167 255].

For different spot colors, the optimal gamut technique may be different. For example, delta-E2000 was the optimal gamut mapping technique for the Pantone® 251C spot color, while cusp was the optimal gamut mapping technique for the Pantone® 3385C spot color. The optimal illuminant spectra and the optical gamut mapping technique may be calculated a priori for all spot colors and stored. While creating new device specific recipes, the pre-calculated illuminant spectra and the gamut mapping techniques may be used on a per spot color basis.

For any new out-of-gamut spot colors (i.e., for user-defined spot colors or for spot colors not included in the spot color database) the embodiments disclosed herein may be executed to find suitable optical illuminant spectra and gamut mapping technique for computing the optical device specific recipe.

While this disclosure has been described in connection with what is presently considered to be the most practical and preferred embodiment, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

What is claimed is:

1. A method for adaptive illumination independent matching of out-of-gamut spot colors for a printing system, the method being implemented in a computer system comprising one or more processors configured to execute one or more computer program modules, comprising:

obtaining a color value for at least one spot color;

obtaining a color value for each of a plurality of illuminants;

converting, using the one or more processors, the at least one spot color value to illuminant specific target values corresponding to each of the plurality of illuminants using each of a plurality of gamut mapping techniques;

determining, using the one or more processors, a device specific recipe for the at least one spot color for each of the illuminant specific target values for the printing system, wherein each of the determined device specific recipes corresponds to each of the plurality of illuminants using each of the plurality of gamut mapping techniques;

for each of the determined device specific recipes, calculating, using the one or more processors, color dispersion values for that same determined device specific recipe for all the remaining of the plurality of illuminants other than the illuminant used to determine the device specific recipe using each of the plurality of gamut mapping techniques; and using the calculated color dispersion values to select a device specific recipe for the at least one spot color from the determined device specific recipes of the at least one spot color and to select one of the gamut mapping techniques for the at least one spot color, wherein the selected device specific recipe and the selected gamut mapping technique for the at least one spot color yield a lowest color dispersion value across all of the plurality of illuminants.

2. The method according to claim 1, wherein determining the device specific recipe for each of the target values comprises:

calculating a device specific recipe for a target color value for one of the gamut mapping techniques;

printing, via the printing system, a test pattern according to the device specific recipe;

measuring, via a color sensor, a color value of the printed test pattern; and adjusting the device specific recipe, and printing and measuring test patterns according to the adjusted recipe, as needed, until the target and measured color values are within a predetermined tolerance.

3. The method according to claim 1, wherein calculating the color dispersion value comprises:

calculating a maximum color dispersion for each of the plurality of illuminants based on the device specific recipes; and selecting a device specific recipe and one of the gamut mapping techniques for the at least one spot color that yields the minimum of the maximum color dispersion across the plurality of illuminants.

4. The method according to claim 1, wherein calculating the color dispersion value comprises:

calculating an average or 95 percentile color dispersion for each of the plurality of illuminants based on the device specific recipes; and selecting a device specific recipe and one of the gamut mapping techniques for the at least one spot color that yields the minimum of the average or the 95 percentile color dispersion across the plurality of illuminants.

5. The method according to claim 1, wherein
(i) the color dispersion value is a metameric index and the recipe is selected according to the minimum of the metameric index;
(ii) the color dispersion value is a reference color difference quantity and the recipe is selected according to the minimum of the reference color difference quantity; or
(iii) the color dispersion value is a color inconsistency index and the recipe is selected according to the minimum of the color inconsistency index.

6. The method according to claim 1, further comprising:
(i) using a sensor to obtain the color value for at least one illuminant; or
(ii) receiving, from a database, the color value for at least one illuminant.

7. The method according to claim 1, further comprising:
(i) using a sensor to obtain the color value of the at least one spot color; or
(ii) receiving, from a database, the color value for at least one spot color.

8. The method according to claim 1, wherein the color dispersion is measured in delta-E 1976 or delta-E 2000.

9. The method according to claim 1, further comprising determining one or more parameters used for the selected gamut mapping technique that yields the lowest color dispersion across the plurality of illuminants.

10. The method according to claim 1, wherein the color value of the at least one spot color, the at least one illuminant, or a combination thereof are Trichometric quantities.

11. The method according to claim 10, wherein the Trichometric quantities are CIE L*a*b* values.

12. The method according to claim 1, wherein the color value of the at least one spot color, the at least one illuminant, or a combination thereof are spectral data.

13. A system for adaptive illumination independent matching of out-of-gamut spot colors for a printing system comprising:
a print engine configured to render color;
a sensor configured to measure a color value of a printed color; and
a processor configured to:
(i) obtain a color value for at least one spot color;
(ii) obtain a color value for each of a plurality of illuminants;
(iii) convert the at least one spot color value to illuminant specific target color values corresponding to each of the plurality of illuminants using each of a plurality of gamut mapping techniques;
(iv) determine a device specific recipe for the at least one spot color for each of the illuminant specific target color values for the printing system, wherein each of the determined device specific recipes corresponds to each of the plurality of illuminants using each of the plurality of gamut mapping techniques;
(v) for each of the determined device specific recipes, calculate, using the one or more processors, color dispersion values for that same determined device specific recipe for all the remaining of the plurality of illuminants other than the illuminant used to determine the device specific recipe using each of the plurality of gamut mapping techniques; and
(vi) use the calculated color dispersion values to select a device specific recipe for the at least one spot color from the determined device specific recipes of the at least one spot color and to select one of the gamut mapping techniques for the at least one spot color, wherein the selected device specific recipe and the selected gamut mapping technique for the at least one spot color yield a lowest color dispersion value across all of the plurality of illuminants.

14. The system according to claim 13, wherein in determining the device specific recipe for each of the target values the processor is configured to:
calculate device specific recipe for a target value for one of the gamut mapping techniques;
print, via the printing engine, a test pattern according to the device specific recipe;
measure, via the color sensor, a color value of the printed test pattern; and
adjust the device specific recipe, and printing and measuring test patterns according to the adjusted recipe, as needed, until the target and measured color values are within a predetermined tolerance.

15. The system according to claim 13, wherein in calculating the color dispersion value the processor is configured to:
calculate an average or 95 percentile color dispersion for each of the plurality of illuminants based on the device specific recipes; and
select a device specific recipe and one of the gamut mapping techniques for the at least one spot color that yields the minimum of the average or 95 percentile color dispersion across the plurality of illuminants.

16. The system according to claim 13, wherein
(i) the color dispersion value is a metameric index and the recipe is selected according to the minimum of the metameric index;
(ii) the color dispersion value is a reference color difference quantity and the recipe is selected according to the minimum of the reference color difference quantity; or
(iii) the color dispersion value is a color inconsistency index and the recipe is selected according to the minimum of the color inconsistency index.

17. The system according to claim 13, further comprising: an illumination sensor configured to obtain the color value for at least one illuminant; or a database configured to store the color value for at least one illuminant.

18. The system according to claim 13, further comprising: a sensor configured to obtain the color value of the at least one spot color; or a database configured to store the color value for at least one spot color.

19. The system according to claim 13, wherein the color dispersion is measured in delta-E 1976 or delta-E 2000.

20. The system according to claim 13, wherein the processor is configured to determine one or more parameters used for the selected gamut mapping technique that yields the lowest color dispersion across the plurality of illuminants.

21. The system to claim 13, wherein the color value of the at least one spot color, the at least one illuminant, or a combination thereof are Trichometric quantities.

22. The system according to claim 21, wherein the Trichometric quantities are CIE L*a*b* values.

23. The system according to claim 13, wherein the color value of the at least one spot color, the at least one illuminant, or a combination thereof are spectral data.

24. A computer program product embodied on a non-transitory computer-readable storage medium having computer-readable instructions stored therein that when executed by a processor are configured to implement a method for adaptive illumination independent matching of out-of-gamut spot colors for a printing system, the method comprising:
   obtaining a color value for at least one spot color;
   obtaining a color value for each of a plurality of illuminants;
   converting, using the one or more processors, the at least one spot color value to illuminant specific target values corresponding to each of the plurality of illuminants using each of a plurality of gamut mapping techniques;
   determining, using the one or more processors, a device specific recipe for the at least one spot color for each of the illuminant specific target values for the printing system, wherein each of the determined device specific recipes corresponds to each of the plurality of illuminants using each of the plurality of gamut mapping techniques;
   for each of the determined device specific recipes, calculating, using the one or more processors, color dispersion values for that same determined device specific recipe for all the remaining of the plurality of illuminants other than the illuminant used to determine the device specific recipe using each of the plurality of gamut mapping techniques; and
   using the calculated color dispersion values to select a device specific recipe for the at least one spot color from the determined device specific recipes of the at least one spot color and to select one of the gamut mapping techniques for the at least one spot color, wherein the selected device specific recipe and the selected gamut mapping technique for the at least one spot color yield a lowest color dispersion value across all of the plurality of illuminants.

25. The system according to claim 13, wherein in calculating the color dispersion value the processor is configured to:
   calculate a maximum color dispersion for each of the plurality of illuminants based on the device specific recipes; and
   select a device specific recipe and one of the gamut mapping techniques for the at least one spot color that yields the minimum of the maximum color dispersion across the plurality of illuminants.

* * * * *